(12) United States Patent
Ou et al.

(10) Patent No.: US 11,993,857 B2
(45) Date of Patent: *May 28, 2024

(54) $CO_2$ REDUCTION TOWARD METHANE

(71) Applicant: The Regents of the University of Michigan, Ann Arbor, MI (US)

(72) Inventors: Pengfei Ou, Montreal (CA); Jun Song, Montreal (CA); Baowen Zhou, Ann Arbor, MI (US); Zetian Mi, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,966

(22) Filed: Nov. 28, 2022

(65) Prior Publication Data

US 2023/0094781 A1 Mar. 30, 2023

Related U.S. Application Data

(63) Continuation of application No. 17/116,220, filed on Dec. 9, 2020, now Pat. No. 11,512,399.

(60) Provisional application No. 62/945,661, filed on Dec. 9, 2019.

(51) Int. Cl.
 *C25B 3/26* (2021.01)
 *B01J 23/72* (2006.01)
 *B01J 23/745* (2006.01)
 *C25B 3/03* (2021.01)
 *C25B 3/21* (2021.01)
 (Continued)

(52) U.S. Cl.
 CPC .......... *C25B 3/26* (2021.01); *B01J 23/72* (2013.01); *B01J 23/745* (2013.01); *C25B 3/03* (2021.01); *C25B 3/21* (2021.01); *C25B 11/053* (2021.01); *B82Y 30/00* (2013.01)

(58) Field of Classification Search
 None
 See application file for complete search history.

(56) References Cited

U.S. PATENT DOCUMENTS

| 2014/0000697 A1* | 1/2014 | Wang | B01J 35/004 204/291 |
| 2015/0259810 A1* | 9/2015 | Lewis | B01J 35/0033 204/291 |

FOREIGN PATENT DOCUMENTS

WO WO-2019086556 A1 * 5/2019

OTHER PUBLICATIONS

Yang et al. ACS Catal. 2017, 7, 177-180 (Year: 2017).*
(Continued)

*Primary Examiner* — Wojciech Haske
(74) *Attorney, Agent, or Firm* — Lempia Summerfield Katz LLC

(57) ABSTRACT

An electrode of a chemical cell includes a substrate having a surface, an array of conductive projections supported by the substrate and extending outward from the surface of the substrate, each conductive projection of the array of conductive projections having a semiconductor composition for reduction of carbon dioxide ($CO_2$) in the chemical cell, and a catalyst arrangement disposed along each conductive projection of the array of conductive projections, the catalyst arrangement including a copper-based catalyst and an iron-based catalyst for the reduction of carbon dioxide ($CO_2$) in the chemical cell.

25 Claims, 9 Drawing Sheets

(51) Int. Cl.
C25B 11/053 (2021.01)
B82Y 30/00 (2011.01)

(56) References Cited

OTHER PUBLICATIONS

Zhang et al. Nature Communications | (2018) 9:381 (Year: 2018).*
Garcia-Torregrosaet al. ACS Appl. Mater. Interfaces 2019, 11, 36485-36496 (Year: 2019).*
Supplemental information to Yang et al. ACS Catal. 2017, 7, 177-180 (Year: 2017).*
Espinos JP, et al. (2002) Interface effects for Cu, CuO, and Cu2O deposited on SiO2 and ZrO2. XPS determination of the valence state of copper in Cu/SiO2 and Cu/ZrO2 catalysts. J Phys Chem B 106:6921-6929.
Lunkenbein T, Schumann J, Behrens M, Schlögl R, Willinger MG (2015) Formation of a ZnO overlayer in industrial Cu/ZnO/Al2O3 catalysts induced by strong metal-support interactions. Angew Chem Int Ed. 54:4544-4548.
Peterson AA, Abild-Pedersen F, Studt F, Rossmeisl J, Norskov JK (2010) How copper catalyzes the electroreduction of carbon dioxide into hydrocarbon fuels. Energy Environ Sci 3:1311-1315.
Asadi M, et al. (2016) Nanostructured transition metal dichalcogenide electrocatalysts for CO2 reduction in ionic liquid. Science 353:467-469.
Baker LR, et al. (2012) Furfuraldehyde hydrogenation on titanium oxide-supported platinum nanoparticles studied by sum frequency generation vibrational spectroscopy: acid-base catalysis explains the molecular origin of strong metal-support interactions. J Am Chem Soc 134:14208-14216.
Behrens M, et al. (2012) The active site of methanol synthesis over Cu/ZnO/Al2O3 industrial catalysts. Science 336:893-897.
Bernal M, et al. (2018) CO2 electroreduction on copper-cobalt nanoparticles: size and composition effect. Nano Energy 53:27-36.
Bongartz D, et al. (2018) Comparison of light-duty transportation fuels produced from renewable hydrogen and green carbon dioxide. Appl Energy 231:757-767.
Calderone et al., "Bimetallic Catalysts for the Fischer-Tropsch Reaction", Green Chemistry, 2011, pp. 1950-1959.
Chu S, et al. (2016) Tunable syngas production from CO2 and H2O in an aqueous photoelectrochemical cell. Angew Chem Int Ed 55:14260-14264.
Chu S, et al. (2018) Photoelectrochemical CO2 reduction into syngas with the metal/oxide interface. J Am Chem Soc 140:7869-7877.
Ding Q, et al. (2014) Efficient photoelectrochemical hydrogen generation using heterostructures of Si and chemically exfoliated metallic MoS2. J Am Chem Soc 136:8504-8507.
Gao DF, et al. (2017) Enhancing CO2 electroreduction with the metal-oxide interface. J Am Chem Soc 139:5652-5655.
Graciani J, et al. (2014) Highly active copper-ceria and copper-ceria-titania catalysts for methanol synthesis from CO2. Science 345:546-550.
Henkelman G, Arnaldsson A, Jónsson H (2006) A fast and robust algorithm for Bader decomposition of charge density. Comput Mater Sci 36:354-360.
Hinogami R, Nakamura Y, Yae S, Nakato Y (1998) An approach to ideal semiconductor electrodes for efficient photoelectrochemical reduction of carbon dioxide by modification with small metal particles. J Phys Chem B 102:974-980.
Hohenberg P, Kohn W (1964) Inhomogeneous electron gas. Phys Rev 136:B864.
Huygh S, Bogaerts A, Neyts EC (2016) How oxygen vacancies activate CO2 dissociation on TiO2 anatase (001). J Phys Chem C 120:21659-21669.
Inoue T, Fujishima A, Konishi S, Honda K (1979) Photoelectrocatalytic reduction of carbon dioxide in aqueous suspensions of semiconductor powders. Nature 277:637-638.

Karlberg GS, Wahnström G (2004) Density-functional based modeling of the intermediate in the water production reaction on Pt(111). Phys Rev Lett 92:136103.
Kattel S, et al. (2016) CO2 hydrogenation over oxide-supported PtCo catalysts: the role of the oxide support in determining the product selectivity. Angew Chem Int Ed 55:7968-7973.
Kattel S, et al. (2016) Optimizing binding energies of key intermediates for CO2 hydrogenation to methanol over oxide-supported Copper. J Am Chem Soc 138:12440-12450.
Kattel S, Liu P, Chen JG (2017) Tuning selectivity of CO2 hydrogenation reactions at the metal/oxide interface. J Am Chem Soc 139:9739-9754.
Kattel S, Ramirez PJ, Chen JG, Rodriguez JA, Liu P (2017) Catalysis active sites for CO2 hydrogenation to methanol on Cu/ZnO catalysts. Science 355:1296-1299.
Kattel S, Yan B, Chen JG, Liu P (2016) CO2 hydrogenation on Pt, Pt/SiO2, and Pt/TiO2: importance of synergy between Pt and oxide support. J Catal 343:115-126.
Kohn W, Sham LJ, (1965) Self-consistent equations including exchange and correlation effects. Phys Rev 140:A1133.
Kong Q, et al. (2016) Directed assembly of nanoparticle catalysts on nanowire photoelectrodes for photoelectrochemical CO2 reduction. Nano Lett 16:5675-5680.
Kresse G, Furthmuller J (1996) Efficient iternative schemes for ab initio total-energy calculations using a plane-wave basis set. Phys Rev B 54:11169.
Kresse G, Joubert D (1999) From ultrasoft pseudopotentials to the projector augmented-wave method. Phys Rev B 59:1758.
Kuhl KP, Cave ER, Abram DN, Jaramillo TF (2012) New insights into the electrochemical reduction of carbon dioxide on metallic copper surfaces. Energy Environ Sci 5:7050-7059.
Kuhl KP, et al. (2014) Electrocatalytic conversion of carbon dioxide to methane and methanol on transition metal surfaces. J Am Chem Soc 136:14107-14113.
Li CW, Ciston J, Kanan, MW (2014) Electroreduction of carbon monoxide to liquid fuel on oxide-derived nanocrystalline copper. Nature 508:504-507.
Li et al., "Reduction of CO2 to low carbon alcohols on CuO Fcs/Fe2O3 NTs catalyst with photoelectric dual catalytic interfaces", Nanoscale, 2013, 5, 11748-11754.
Li L, et al. (2017) Nitrogen photofixation over III-nitride nanowires assisted by ruthenium clusters of low atomicity. Angew Chem Int Ed 56:8701-8705.
Li X, Yu JG, Jaroniec M, Chen XB (2019) Cocatalysts for selective photoreduction of CO2 into solar fuels. Chem Rev 119:3962-4179.
Li YF, et al. (2017) Structure-sensitive CO2 electroreduction to hydrocarbons on ultrathin 5-fold twinned copper wires. Nano Lett 17:1312-1317.
Lin S, et al. (2015) Covalent organic frameworks comprising cobalt porphyrins for catalytic CO2 reduction in water. Science 349:1208.
Liu C, Dasgupta NP, Yang PD (2014) Semiconductor nanowires for artificial photosynthesis. Chem Mater 26:415-422.
Liu C, et al. (2015) Nanowire-bacteria hybrids for unassisted solar carbon dioxide fixation to value-added chemicals. Nano Lett 15:3634.
Liu SB, et al. (2012) Shape-dependent electrocatalytic reduction of CO2 to CO on triangular silver nanoplates. J Am Chem Soc 139:2160-2163.
Monkhorst HJ, Pack JD (1976) Special points for Brillouin-zone integrations. Phys Rev B 3:5188.
Moshe M, Levin I, Aharoni H, Kupferman R, Sharon E (2015) Geometry and mechanics of two-dimensional defects in amorphous materials. Proc Natl Acad Sci USA 112:10873-10878.
Mota FM, Kim DH (2019) From CO2 methanation to ambitious long-chain hydrocarbons: alternative fuels paving the path to sustainability. Chem Soc Rev 48:205-209.
Nie XW, Esopi MR, Janik MJ, Asthagiri A (2013) Selectivity of CO2 reduction on copper electrodes: the role of the kinetics of elementary steps. Angew Chem Int Ed 52:2459-2462.
Nørskov JK, et al. (2004) Origin of the overpotential for oxygen reduction at a fuel-cell cathode. J Phys Chem B 108:17886-17892.
Park JY, Baker LR, Somorjai GA (2015) Role of hot electrons and metal oxide interfaces in surface chemistry and catalytic reactions. Chem Rev 115:2781-2817.

(56) References Cited

OTHER PUBLICATIONS

Park YS, Lee JS (2017) Correlating light absorption with various nanostructure geometries in vertically aligned silicon nanowire arrays. ACS Photonics 4:2587-2594.

Ran JR, Jaroniec M, Qiao SZ (2018) Cocatalysts in semiconductor-based photocatalytic CO2 reduction: achievements, challenges, and opportunities. Adv Mater 30:1704649.

Rao H, Lim CH, Bonin J, Miyake GM, Robert M (2018) Visible-light-driven conversion of CO2 to CH4 with an organic sensitizer and an iron porphyrin catalyst. J Am Chem Soc 140:17830-17834.

Ren D, Fong JH, Yeo BS (2018) The effects of currents and potentials on the selectivities of copper toward carbon dioxide electroreduction. Nat Commun 9:925.

Reske R, Mistry H, Behafarid F, Cuenya BR, Strasser P (2014) Particle size effects in the catalytic electroreduction of CO2 on Cu nanoparticles. J Am Chem Soc 136:6978-6986.

Rodriguez JA, et al. (2015) Hydrogenation of CO2 to methanol: importance of metal-oxide and metal-carbide interfaces in the activation of CO2. ACS Catal 5:6696-6706.

Rosen BA, et al. (2011) Ionic liquid-mediated selective conversion of CO2 to CO at low over-potentials. Science 334:643.

Sakimoto KK, Wong AB, Yang PD (2016) Self-photosensitization of nonphotosynthetic bacteria for solar-to-chemical production. Science 351:74-77.

Sakong S, Gross A (2003) Dissociative adsorption of hydrogen on strained Cu surfaces. Surf Sci 525:107-118.

Sanville E, Kenny SD, Smith R, Henkelman G (2007) Improved grid-based algorithm for Bader charge allocation. J Comput Chem 28:899-908.

Schouten KJP, Kwon Y, van der Ham CJM, Qin Z, Koper MTM (2011) A new mechanism for the selectivity to C1 and C2 species in the electrochemical reduction of carbon dioxide on copper electrodes. Chem Sci 2:1902-1909.

Schreier M, et al. (2017) Solar conversion of CO2 to CO using earth-abundant electrocatalysts prepared by atomic layer modification of CuO. Nat Energy 2:17087.

Shan B, et al. (2019) Binary molecular-semiconductor p-n junctions for photoelectrocatalytic CO2 reduction. Nat Energy 4:290-299.

Singh MR, Clark EL, Bell AT (2015) Effects of electrolyte, catalyst, and membrane composition and operating conditions on the performance of solar-driven electrochemical reduction of carbon dioxide. Phys Chem Chem Phys 17:18924-18936.

Tripković V, Skúlason E, Siahrostami S, Nørskov JK, Rossmeisl J (2010) The oxygen reduction reaction mechanism on Pt(111) from density functional theory calculations. Electrochim Acta 55:7975-7981.

Vanka S, et al. (2018) High efficiency Si photocathode protected by multifunctional GaN nanostructures. Nano Lett 18:6530-6537.

Wang et al., A Monolithically Integrated Gallium Nitride Nanowire/Silicon Solar Cell Photocathode for Selective Darbon Dioxide Reduction to Methane, Chemistry, A European Journal Communication, 2016, pp. 8809-8813.

Wang YC, et al. (2016) A monolithically integrated gallium nitride nanowire/silicon solar cell photocathode for selective carbon dioxide reduction to methane. Chem Eur J 22:8809-8813.

Wang YF, Han P, Lv XM, Zhang LJ, Zheng GF (2018) Defect and interface engineering for aqueous electrocatalytic CO2 reduction. Joule 2:2551-2582.

Weng Z, et al. (2016) Electrochemical CO2 reduction to hydrocarbons on a heterogeneous molecular Cu catalyst in aqueous solution. J Am Chem Soc 138:8076-8079.

White JL, et al. (2015) Light-driven heterogeneous reduction of carbon dioxide: photocatalysts and photoelectrodes. Chem Rev 115:12888-12935.

Xie JJ, et al. (2018) Highly selective oxidation of methane to methanol at ambient conditions by titanium dioxide-supported iron species. Nat Catal 1:889-896.

Yang YX, White MG, Liu P (2012) Theoretical study of methanol synthesis from CO2 hydrogenation on metal-doped Cu(111) surfaces. J Phys Chem C 116, 248-256.

Yin G, et al. (2017) Selective electro- or photo-reduction of carbon dioxide to formic acid using a Cu—Zn alloy catalyst. J Mater Chem A 5:12113-12119.

Zhai LN, et al. (2017) Titania-modified silver electrocatalyt for selective CO2 reduction to CH3OH and CH4 from DFT study. J Phys Chem C 121:16275-16282.

Zhang HX, et al. (2016) A p-Si/NiCoSex core/shell nanopillar array photocathode for enhanced photoelectrochemical hydrogen production. Energy Environ Sci 9:3113-3119.

Zhang L, Zhao ZJ, Gong JL (2017) Nanostructured materials for heterogeneous electrocatalytic CO2 reduction and their related reaction mechanism. Angew Chem Int Ed 56:11326-11353.

Zhang SY, Zhu HL, Zheng, YQ (2019) Surface modification of CuO nanoflake with Co3O4 nanowire for oxygen evolution reaction and electrocatalytic reduction of CO2 in water to syngas. Electrochim Acta 299:282-288.

Zhou BW, et al. (2018) Gallium nitride nanowire as a linker of molybdenum sulfides and silicon for photoelectrocatalytic water splitting. Nat Commun 9:3856.

Zhou BW, et al. (2018) Mo—Bi—Cd ternary metal chalcogenides: highly efficient photocatalyst for CO2 reduction to formic acid under visible light. ACS Sustainable Chem Eng 6:5754-5759.

Zhu DD, Liu JL, Qiao SZ (2016) Recent advances in inorganic heterogeneous electrocatalysts for reduction of carbon dioxide. Adv Mater 28:3423-3452.

\* cited by examiner

CO₂ REDUCTION TOWARD METHANE

CROSS-REFERENCES TO RELATED APPLICATIONS

This application is a continuation of co-pending U.S. patent application Ser. No. 17/116,220, filed Dec. 9, 2020, which claims the benefit of U.S. provisional application entitled "CO₂ Reduction toward Methane," filed Dec. 9, 2019, and assigned Ser. No. 62/945,661, the entire disclosures of which are hereby expressly incorporated by reference.

BACKGROUND OF THE DISCLOSURE

Field of the Disclosure

The disclosure relates generally to photoelectrochemical and other chemical reduction of carbon dioxide ($CO_2$) into methane.

Brief Description of Related Technology

Solar-powered $CO_2$ reduction with water ($H_2O$) has been proposed as a mechanism for reducing greenhouse gas ($CO_2$) emissions, while simultaneously converting renewable solar energy into storable, value-added fuels and other chemicals. The photoelectrochemical (PEC) route to $CO_2$ reduction combines light harvesting photovoltaic and electrochemical components into a monolithically integrated device.

Among various products formed from PEC $CO_2$ reduction, the most reduced, methane, is highly energy-dense ($\Delta H_C° = 891$ kJ/mol). The storage, transportation, and combustion of methane are compatible with the existing industrial infrastructure. Methane is thus an ideal solar fuel. Unfortunately, the production of methane involves complicated eight-electron/proton coupling transfer, which is both kinetically and thermodynamically unfavorable.

A number of electrocatalysts including molecular complexes, enzymes, metals, and transition metal chalcogenides, have been developed for $CO_2$ reduction. Among these materials, copper (Cu) is known to be a state-of-the-art electrocatalyst for producing methane from $CO_2$ reduction. However, the use of Cu as a catalyst for PEC methane synthesis has suffered severely from low current density, inferior Faradaic efficiency, low turnover frequency, and high overpotential. This is because Cu, with a monofunctional site, generally possesses a very weak interaction with $CO_2$, and is not capable of concurrently activating $CO_2$ molecules and stabilizing the subsequent reaction intermediates.

Binary catalysts of Cu with secondary metals and their derivatives have emerged as a possible approach to enhance the performance of PEC $CO_2$ reduction. For example, an oxide-derived Cu—Zn electrocatalyst exhibited a remarkable enhancement on tunable syngas formation with a benchmark turnover number of 1330 compared to Cu alone. Directed assembly of CuAu nanoparticles on silicon nanowire photoelectrodes exhibited an evidently accelerated $CO_2$-to-CO conversion with high selectivity of 80% at −0.2 V. A Cu—Zn alloy for selectively reducing $CO_2$ towards HCOOH exhibited a Faradaic efficiency of 79.11% through photoelectrocatalysis, which is superior to either Zn or Cu. Nevertheless, these reported binary systems are still not efficient enough to improve the interaction with $CO_2$ for methane synthesis from PEC $CO_2$ reduction.

SUMMARY OF THE DISCLOSURE

In accordance with one aspect of the disclosure, an electrode of a chemical cell includes a substrate having a surface, an array of conductive projections supported by the substrate and extending outward from the surface of the substrate, each conductive projection of the array of conductive projections having a semiconductor composition for reduction of carbon dioxide ($CO_2$) in the chemical cell, and a catalyst arrangement disposed along each conductive projection of the array of conductive projections, the catalyst arrangement including a copper-based catalyst and an iron-based catalyst for the reduction of carbon dioxide ($CO_2$) in the chemical cell.

In accordance with another aspect of the disclosure, a photocathode for a photoelectrochemical cell includes a substrate including a light absorbing material, the light absorbing material being configured to generate charge carriers upon solar illumination, an array of conductive projections supported by the substrate, each conductive projection of the array of conductive projections being configured to extract the charge carriers from the substrate, a plurality of catalyst particles disposed across each conductive projection of the array of conductive projections, each catalyst particle of the plurality of catalyst particles including copper, and a distribution of an iron-based catalyst disposed adjacent to the plurality of catalyst particles in a co-catalyst arrangement with the plurality of catalyst particles for the reduction of carbon dioxide ($CO_2$) in the chemical cell.

In accordance with yet another aspect of the disclosure, a method of fabricating an electrode of an electrochemical system includes growing an array of conductive projections on a semiconductor substrate, each conductive projection of the array of conductive projections having a semiconductor composition for reduction of carbon dioxide ($CO_2$) in the electrochemical system, and depositing a catalyst arrangement along each conductive projection of the array of conductive projections, the catalyst arrangement including a copper-based catalyst and an iron-based catalyst for the reduction of carbon dioxide ($CO_2$) in the chemical cell.

In connection with any one of the aforementioned aspects, the electrodes, systems, and/or methods described herein may alternatively or additionally include or involve any combination of one or more of the following aspects or features. The copper-based catalyst includes a plurality of copper nanoparticles. The iron-based catalyst includes a distribution of iron oxide disposed in a co-catalyst arrangement with the copper-based catalyst. The copper-based catalyst is disposed between the iron-based catalyst and the conductive projection. The copper-based catalyst and the iron-based catalyst are linked by a metallic bond. The substrate includes a semiconductor material. The semiconductor material is configured to generate charge carriers upon absorption of solar radiation such that the chemical cell is configured as a photoelectrochemical system. The array of conductive projections are configured to extract the charge carriers generated in the substrate. Each conductive projection of the array of conductive projections includes a respective nanowire. Each conductive projection of the array of conductive projections includes a Group III-V semiconductor material. The structure is planar. The semiconductor composition of the array of conductive projections establishes a Schottky junction with the catalyst arrangement. The catalyst arrangement has an iron-to-copper ratio of about 6.3 to 1. The copper-based catalyst may be partially oxidized. The chemical cell is a thermochemical cell. An electrochemical system including a working electrode configured in accordance with an electrode as described herein, and further including a counter electrode, an electrolyte in which the working and counter electrodes are immersed, and a voltage source that applies a bias voltage between the working and counter electrodes. The bias voltage establishes a preference for the reduction of carbon dioxide ($CO_2$) at the working electrode toward methane. The iron-based catalyst includes iron oxide. Each conductive projection of the array of conductive projections includes a respective nanowire. Each catalyst particle of the plurality of catalyst particles is configured as a copper nanoparticle. Each conductive projection of the array of conductive projections includes a Group III-V semiconductor material. A photoelectrochemical system including a working photocathode configured in accordance with a photocathode described herein, and further including a counter electrode, an electrolyte in which the working photocathode and the counter electrode are immersed, and a voltage source that applies a bias voltage between the working photocathode and the counter electrode. The bias voltage establishes a preference for the reduction of carbon dioxide ($CO_2$) at the working electrode toward methane. Depositing the catalyst arrangement includes implementing a number of electrodeposition cycles. The number of electrodeposition cycles is about 10 cycles. Implementing the number of electrodeposition cycles includes immersing the array of conductive projections in a solution, the solution including a copper precursor and an iron precursor.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 6:
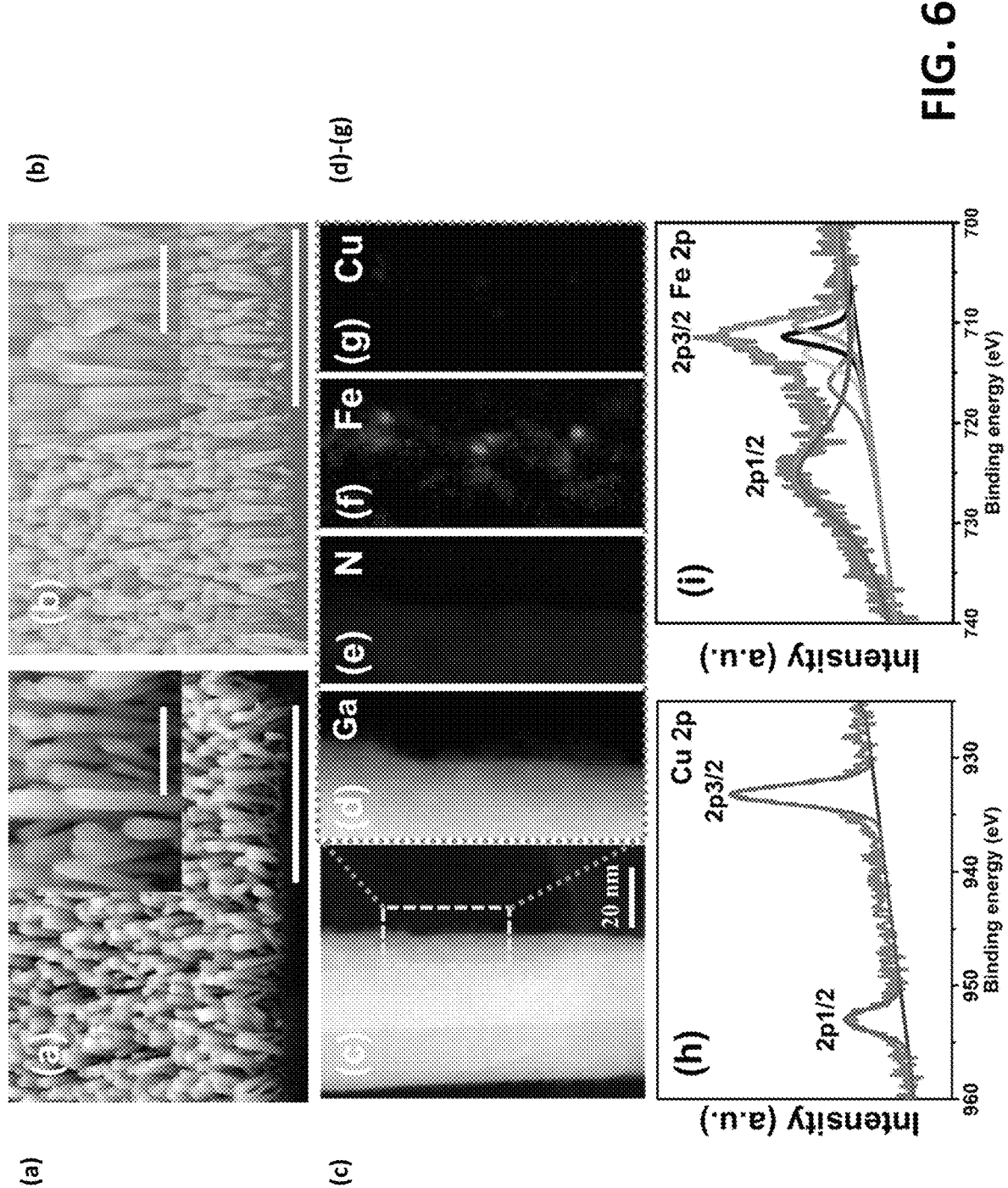

FIG. 6 depicts scanning electron microscope (SEM) images (at 1 µm scale and insets at 500 nm) of bare GaN nanowires on a Si substrate in Part (a), and of a CuFe co-catalyst arrangement on GaN nanowires in Part (b), as well as a STEM-HAADF image of a GaN nanowire modified with binary CuFe catalyst in Part (c), elemental distribution mappings of Ga in Part (d), N in Part (e), Fe in Part (f) and Cu in Part (g), and XPS measurements of Cu 2p in Part (h) and Fe 2p in Part (i) in a CuFe co-catalyst arrangement on GaN nanowires projecting from a Si substrate.

Figure 7:
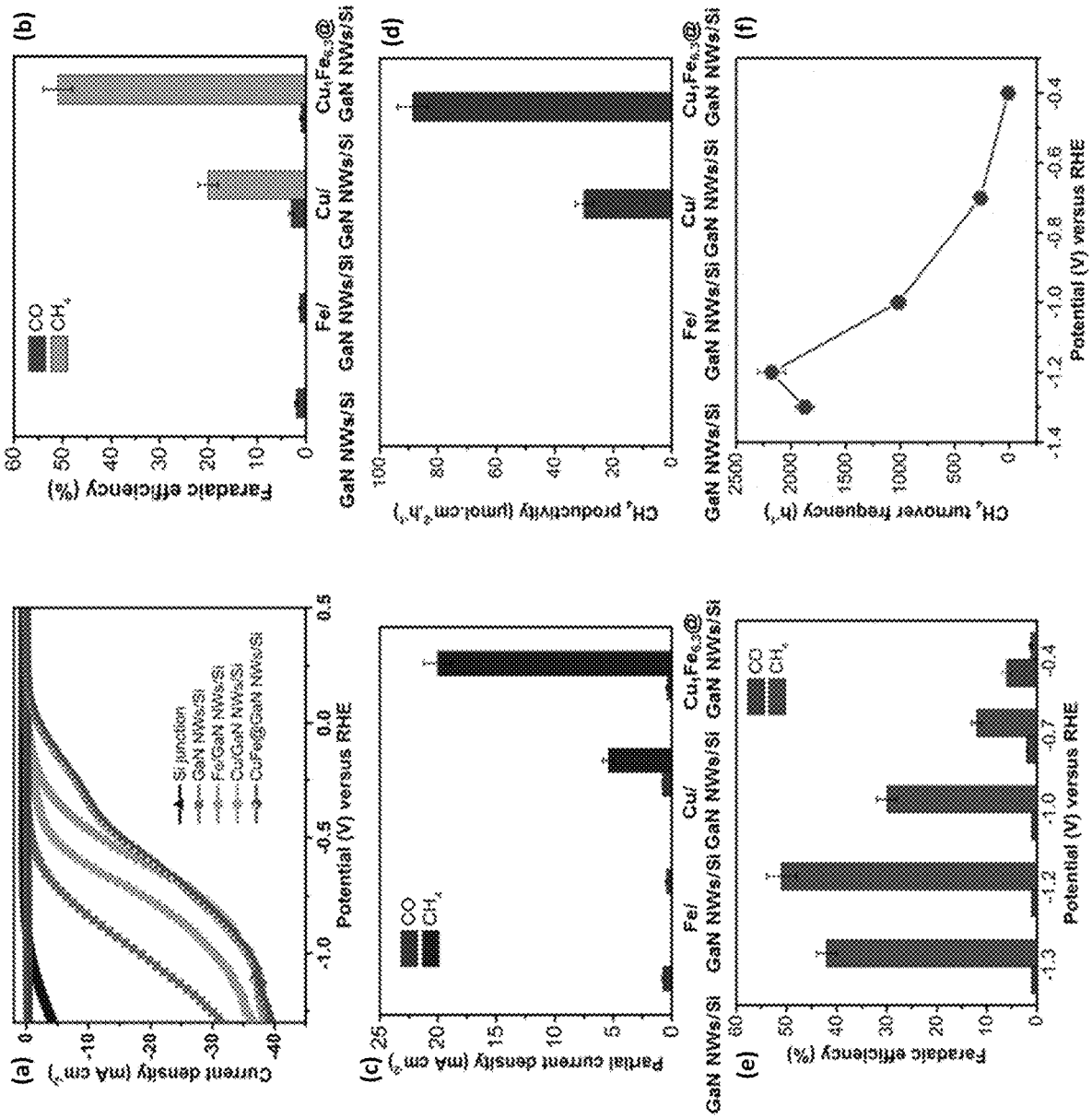

FIG. 7 depicts graphical plots of photoelectrocatalytic performance measurements, including J-V curves in Part (a), Faradaic efficiencies in Part (b), Partial current density in Part (c), and $CH_4$ productivity in Part (d) of GaN nanowires on a Si substrate, Cu on GaN nanowires, iron on GaN nanowires, and CuFe on GaN nanowires, together with a curve in Part (a) that corresponds to CuFe on GaN nanowires under dark, as well as variations of Faradaic efficiencies in Part (e) and turnover frequency in Part (f) for methane synthesis versus applied bias for CuFe on GaN nanowires, under the following experimental conditions: $CO_2$-purged 0.5 M $KHCO_3$ aqueous solution (pH of about 8), and one-sun illumination (AM 1.5 G, 100 $mWcm^{-2}$).

Figure 8:
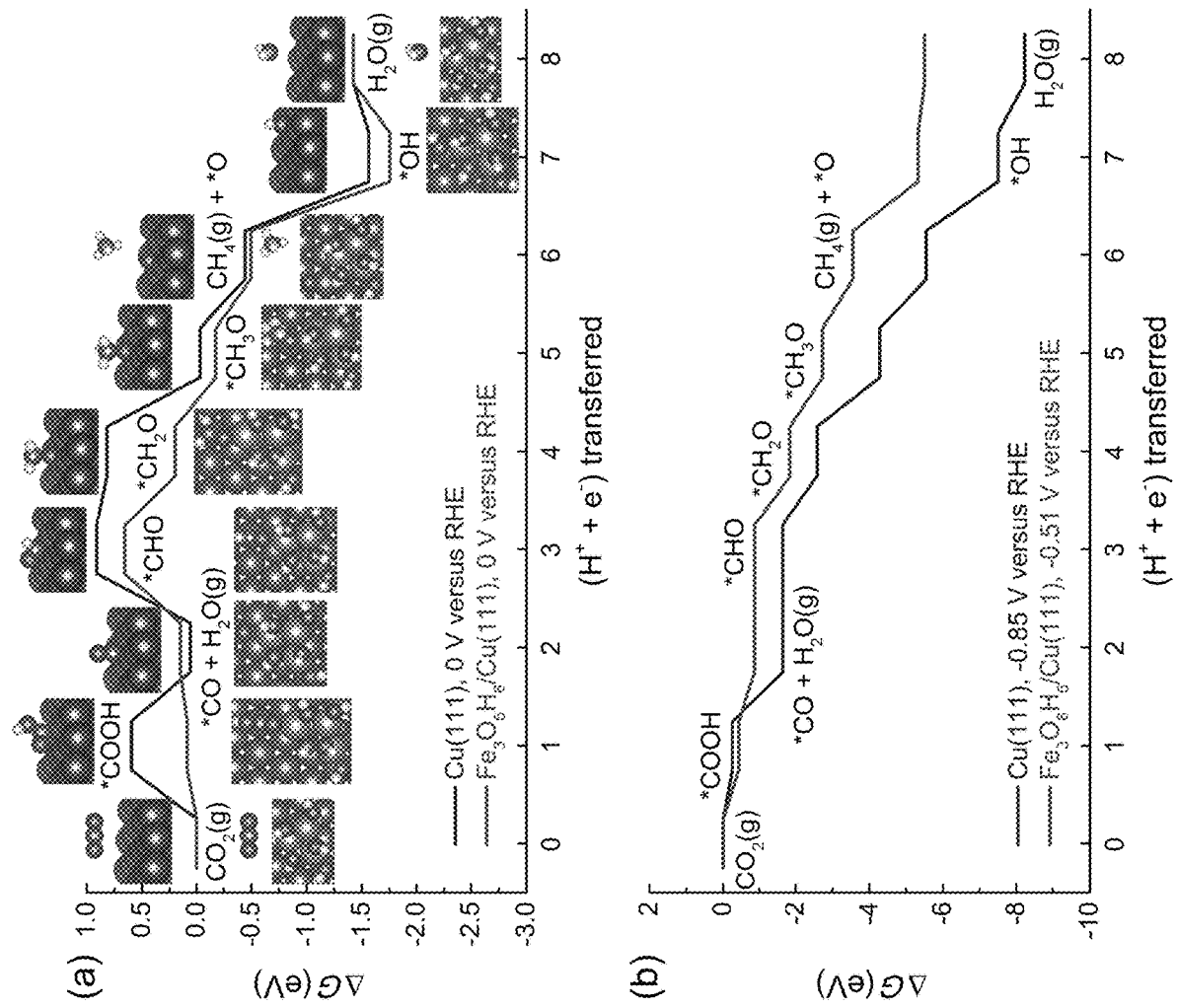

FIG. 8 depicts graphical plots of free energy diagrams for $CO_2$ reduction on Cu(111) and $Fe_3O_6H_6/Cu(111)$ under zero potential in Part (a) and applied electrode potentials in Part (b), respectively, in which $U_L(CO_2)$ shows the potential-determining energy barriers that are overcome for methane production on Cu(111) and $Fe_3O_6H_6/Cu(111)$, respectively, and respective spheres represent hydrogen, carbon, oxygen, copper, and iron.

Figure 9:
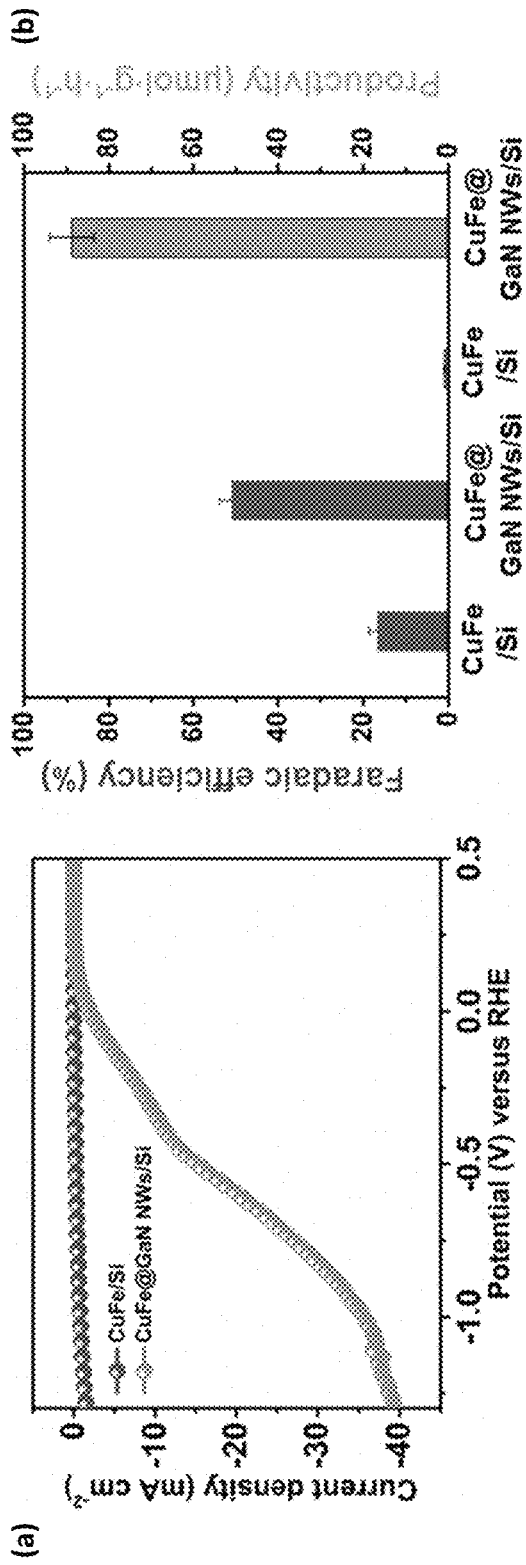
Figure 9:
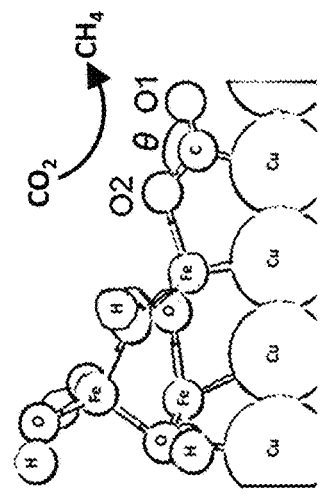
Figure 9:
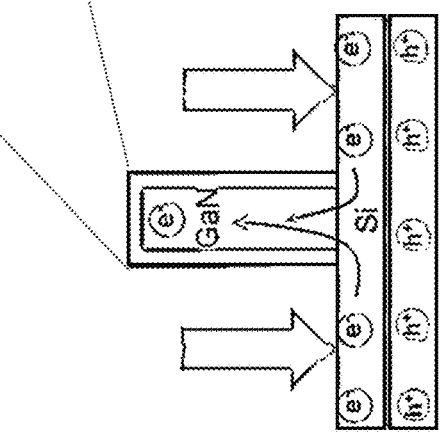

FIG. 9 depicts graphical plots of J-V curves in Part (a) and Faradaic efficiency and productivity in Part (b) of CuFe/Si and CuFe on GaN nanowires supported by a Si substrate, together with a schematic diagram of spatial decoupling of $CO_2$ reduction from light absorption and charge carriers separation over the CuFe on GaN nanowires in Part (c), under the following experimental conditions: $CO_2$-purged 0.5 M $KHCO_3$ aqueous solution (pH of about 8), and one-sun illumination (AM 1.5 G, 100 mW $cm^{-2}$).

The embodiments of the disclosed electrodes, systems, and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Electrodes of photoelectrochemical and other chemical cells having a co-catalyst arrangement for reduction of carbon dioxide ($CO_2$) into methane are described. Methods of fabricating photocathodes and other electrodes for use in photoelectrochemical and other chemical systems are also described.

Although described herein in connection with electrodes having GaN-based nanowire arrays for PEC $CO_2$ reduction, the disclosed electrodes are not limited to PEC reduction or GaN-based nanowires. A wide variety of types of chemical cells may benefit from use of the nanowire-nanoparticle interface, including, for instance, electrochemical cells and thermochemical cells. Moreover, the nature, construction, configuration, characteristics, shape, and other aspects of the structures on or to which the nanowires and/or nanoparticles are deposited may vary. The disclosed electrodes, systems, and methods may also be directed to $CO_2$ reduction products other than or in addition to methane, such as CO, $CH_3OH$, $CH_4$, $C_2H_4$, $C_2H_5OH$, and $C_2H_6$.

Figure 1:
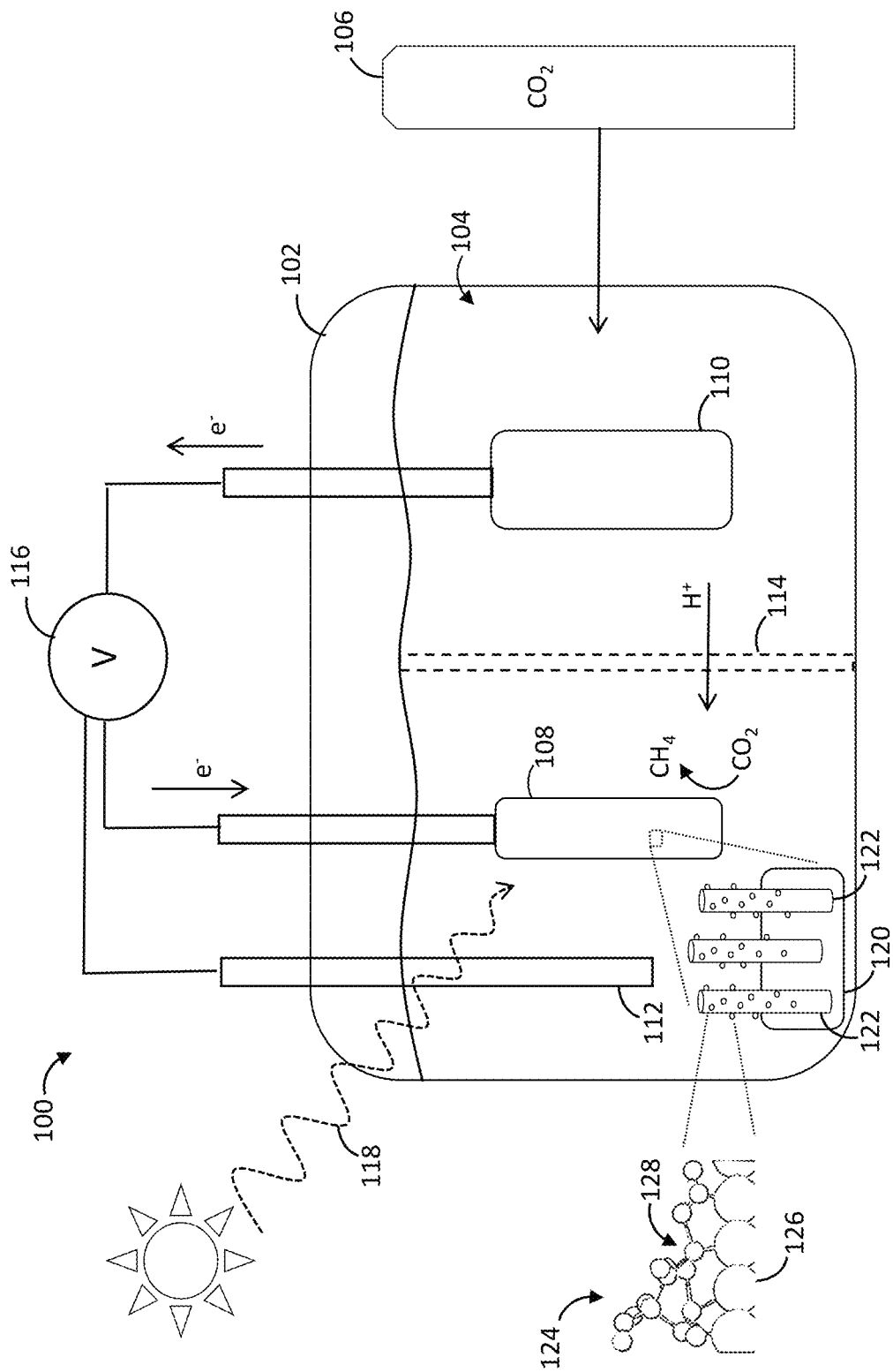
FIG. 1 is a schematic view and block diagram of an electrochemical system having a working electrode with a co-catalyst arrangement disposed along a plurality of nanowires for reduction of carbon dioxide ($CO_2$) into methane in accordance with one example.

FIG. 1 depicts a system 100 for reduction of $CO_2$ into methane. The system 100 may also be configured for other reduction reactions. The system 100 may be configured as an electrochemical system. In this example, the electrochemical system 100 is a photoelectrochemical (PEC) system in which solar or other radiation is used to facilitate the $CO_2$ reduction. The manner in which the PEC system 100 is illuminated may vary. In thermochemical examples, the source of radiation may be replaced by a heat source.

The electrochemical system 100 includes one or more electrochemical cells 102. A single electrochemical cell 102 is shown for ease in illustration and description. The electrochemical cell 102 and other components of the electrochemical system 100 are depicted schematically in FIG. 1 also for ease in illustration. The cell 102 contains an electrolyte solution 104 to which a source 106 of $CO_2$ is applied. In some cases, the electrolyte solution is saturated with $CO_2$. Potassium bicarbonate $KHCO_3$ may be used as an electrolyte. Additional or alternative electrolytes may be used. Further details regarding one example of the electrochemical system 100 are provided below.

The electrochemical cell 102 includes a working electrode 108, a counter electrode 110, and a reference electrode 112, each of which is immersed in the electrolyte 104. The counter electrode 110 may be or include a metal wire, such as a platinum wire. The reference electrode 112 may be configured as a reversible hydrogen electrode (RHE). The configuration of the counter and reference electrodes 110, 112 may vary. For example, the counter electrode 110 may be configured as, or otherwise include, a photoanode at which water oxidation ($4H_2O \Leftrightarrow 2O_2 + 8e^- + 8H^+$) occurs.

The reduction of $CO_2$ to methane occurs at the working electrode 112 as follows:

$CO_2$ reduction: $CO_2 + 8H^+ + 8e^- \Leftrightarrow CH_4$

Figure 3:
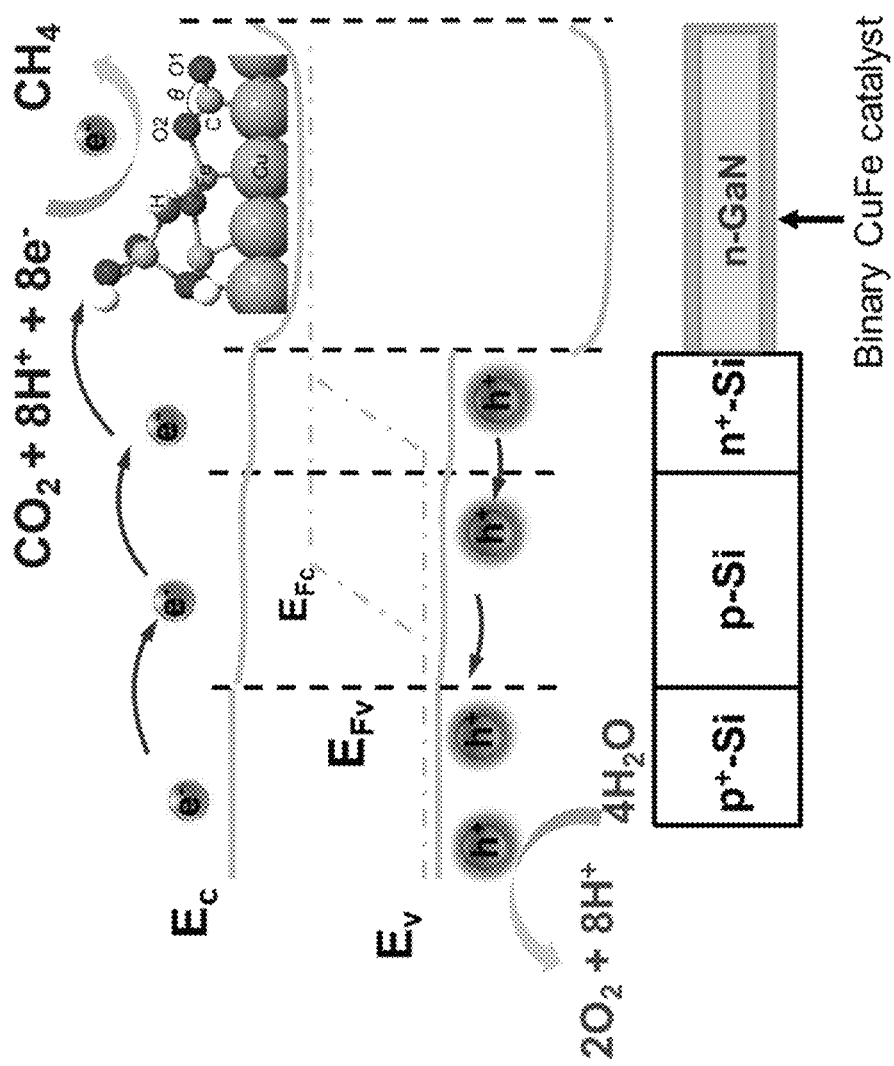
FIG. 3 depicts an energy bandgap diagram of a GaN nanowire with a CuFe-based co-catalyst arrangement for PEC reduction of $CO_2$ toward methane.

To that end, electrons flow from the counter electrode 110 through a circuit path external to the electrochemical cell 102 to reach the working electrode 108. The working and counter electrodes 108, 110 may thus be considered a cathode and an anode, respectively. FIG. 3 depicts an energy bandgap diagram of the reduction of $CO_2$ to methane in connection with a working electrode having a GaN nanowire and a CuFe-based co-catalyst arrangement, as described below.

In the example of FIG. 1, the working and counter electrodes are separated from one another by a membrane 114, e.g., a proton-exchange membrane. The construction, composition, configuration and other characteristics of the membrane 114 may vary.

In this example, the circuit path includes a voltage source 116 of the electrochemical system 100. The voltage source 116 is configured to apply a bias voltage between the working and counter electrodes 108, 110. The bias voltage may be used to establish a ratio of $CO_2$ reduction to hydrogen ($H_2$) evolution at the working electrode, as described further below. The circuit path may include additional or alternative components. For example, the circuit path may include a potentiometer in some cases.

In some cases, the working electrode 108 is configured as a photocathode. Light 118, such as solar radiation, may be incident upon the working electrode 108 as shown. The electrochemical cell 102 may thus be considered and configured as a photoelectrochemical cell. In such cases, illumination of the working electrode 108 may cause charge carriers to be generated in the working electrode 108. Electrons that reach the surface of the working electrode 108 may then be used in the $CO_2$ reduction. The photogenerated electrons may augment the electrons provided via the current path. The photogenerated holes may move to the counter electrode for the water oxidation. Further details regarding examples of photocathodes are provided below.

The working electrode 108 includes a substrate 120. The substrate 120 of the working electrode 108 may constitute a part of an architecture, or a support structure, of the working electrode 108. The substrate 120 may be uniform or composite. For example, the substrate 120 may include any number of layers or other components. The substrate 120 thus may or may not be monolithic. The shape of the substrate 120 may also vary. For instance, the substrate 120 may or may not be planar or flat.

The substrate 120 of the working electrode 108 may be active (functional) and/or passive (e.g., structural). In the latter case, the substrate 120 may be configured and act solely as a support structure for a catalyst arrangement formed along an exterior surface of the working electrode 108, as described below. Alternatively or additionally, the substrate 120 may be composed of, or otherwise include, a material suitable for the growth or other deposition of the catalyst arrangement of the working electrode 108.

The substrate 120 may include a light absorbing material. The light absorbing material is configured to generate charge carriers upon solar or other illumination. The light absorbing material has a bandgap such that incident light generates charge carriers (electron-hole pairs) within the substrate. Some or all of the substrate 120 may be configured for photogeneration of electron-hole pairs. To that end, the substrate 120 may include a semiconductor material. In some cases, the substrate 120 is composed of, or otherwise includes, silicon. For instance, the substrate 120 may be provided as a silicon wafer. The silicon may be doped. In some cases, the substrate 120 is heavily n-type doped, and moderately or lightly p-type doped. The doping arrangement may vary. For example, one or more components of the substrate 120 may be non-doped (intrinsic), or effectively non-doped. The substrate 120 may include alternative or additional layers, including, for instance, support or other structural layers. In other cases, the substrate 120 is not light absorbing. In these and other cases, one or more other components of the photocathode may be configured to act as a light absorber. Thus, in photoelectrochemical cases, the semiconductor material may be configured to generate charge carriers upon absorption of solar (or other) radiation, such that the chemical cell is configured as a photoelectrochemical system.

The substrate 120 of the working electrode 108 establishes a surface at which a co-catalyst arrangement 124 of the electrode 108 is provided as described below.

The working electrode 100 includes an array of conductive projections 122 supported by the substrate 120. Each conductive projection 122 is configured to extract the charge carriers (e.g., electrons) from the substrate 120. The extraction brings the electrons to external sites along the conductive projections 122 for use in the $CO_2$ reduction. In some cases, each conductive projection 122 is configured as a nanowire. Each conductive projection 122 may include a semiconductor core. In some cases, the core is or otherwise includes Gallium nitride (GaN). Other semiconductor materials may be used, including, for instance, other Group III-V nitride semiconductor materials. The core of each nanowire or other conductive projection may be or include a columnar, post-shaped, or other elongated structure that extends outward (e.g., upward) from the plane of the substrate 120. The semiconductor nanowires may be grown or formed as described in U.S. Pat. No. 8,563,395, the entire disclosure of which is hereby incorporated by reference. The conductive projections 122 may be referred to herein as nanowires with the understanding that the dimensions, size, shape, composition, and other characteristics of the projections 122 may vary.

Each conductive projection 122 has a semiconductor composition for catalytic conversion of carbon dioxide ($CO_2$) in the chemical cell 102 into, e.g., methane. As mentioned above, the semiconductor composition may include Gallium nitride. Additional or alternative semiconductor materials may be used, including, for instance, indium nitride, indium gallium nitride, aluminum nitride, boron nitride, aluminum oxide, silicon, and/or their alloys.

The conductive projections 122 may facilitate the conversion in one or more ways. For instance, each conductive projection 122 may be configured to extract the charge carriers (e.g., electrons) generated in the substrate 120. The extraction brings the electrons to external sites along the conductive projections 122 for use in the $CO_2$ reduction. The composition of the conductive projections 122 may also form an interface well-suited for reduction of $CO_2$, as explained below.

Each conductive projection 122 may be or include a columnar, post-shaped, or other elongated structure that extends outward (e.g., upward) from the plane of the substrate 120. The dimensions, size, shape, composition, and other characteristics of the conductive projections 122 may vary. For instance, each conductive projection 122 may or may not be elongated like a nanowire. Thus, other types of conductive projections from the substrate 120, such as various shaped nanocrystals, may be used.

In some cases, one or more of the conductive projections 122 is configured to generate electron-hole pairs upon illumination. For instance, the conductive projections 122 may be configured to absorb light at frequencies different than other light absorbing components of the electrode 108. For example, one light absorbing component, such as the substrate 120, may be configured for absorption in the visible or infrared wavelength ranges, while another component may be configured to absorb light at ultraviolet wavelengths. In other cases, the conductive projections 122 are the only light absorbing component of the electrode 108.

The electrode 108 further includes a catalyst arrangement 124 disposed along each conductive projection 122 for the reduction of carbon dioxide (CO2) in the chemical cell. The catalyst arrangement 124 includes a copper-based catalyst and an iron-based catalyst for the reduction of carbon dioxide ($CO_2$) in the chemical cell. In the example of FIG. 1, the catalyst arrangement 124 includes a plurality of catalyst particles 126 disposed across each conductive projection 122, and a distribution 128 of an iron-based catalyst disposed adjacent to the plurality of catalyst particles. Each catalyst particle 126 includes copper. The iron-based catalyst may be composed of, or otherwise include, iron oxide. A Cu—Fe co-catalyst arrangement is thus provided. In some cases, the copper-based catalyst includes a plurality of copper nanoparticles. The copper-based catalyst may be disposed between the iron-based catalyst and the conductive projection 122.

Figure 5:
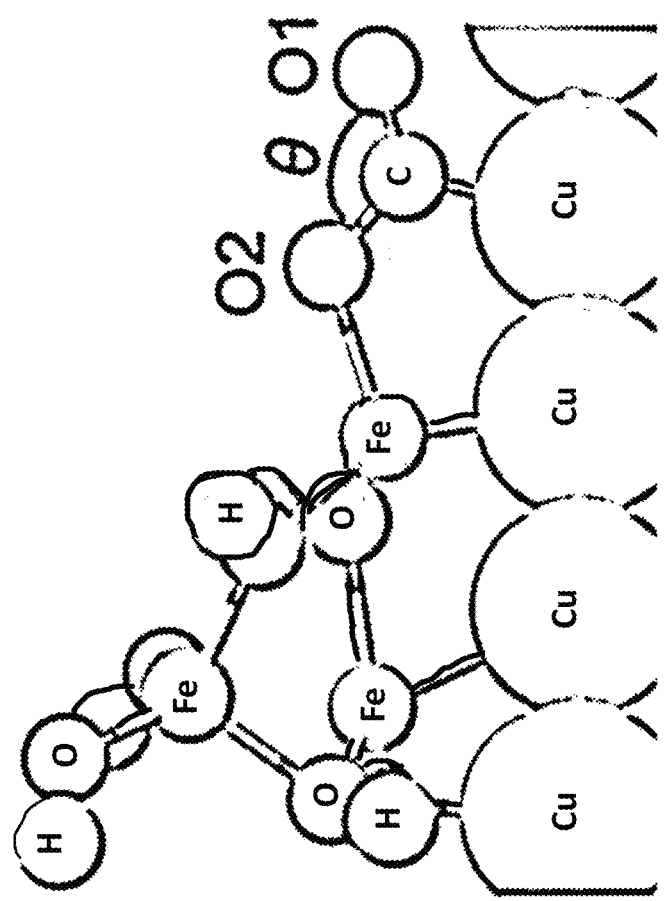
FIG. 5 depicts a side, schematic view of $CO_2$ adsorption and activation involving $Fe_3O_6H_6/Cu(111)$.

The copper-based catalyst and the iron-based catalyst may be linked by one or more metallic bonds, as schematically shown in FIGS. 1 and 5. A Schottky junction may be established between the catalyst arrangement and the semiconductor composition of the array of conductive projections 122.

As described in the examples below, the catalyst arrangement may have an iron-to-copper ratio of about 6.3 to 1. Other ratios may be used, including other ratios in which the number of iron-based catalysts is greater than the number of the copper-based catalysts. In some cases, the copper-based catalyst may be partially oxidized.

The distribution of the co-catalyst arrangement 124 across the conductive projections 122 may be uniform or non-uniform. For instance, the Cu-based particles 126 may thus be distributed randomly across the outer surface of each conductive projection 122. The arrangement shown in FIGS. 1 and 5 is for ease in illustration.

Figure 2:
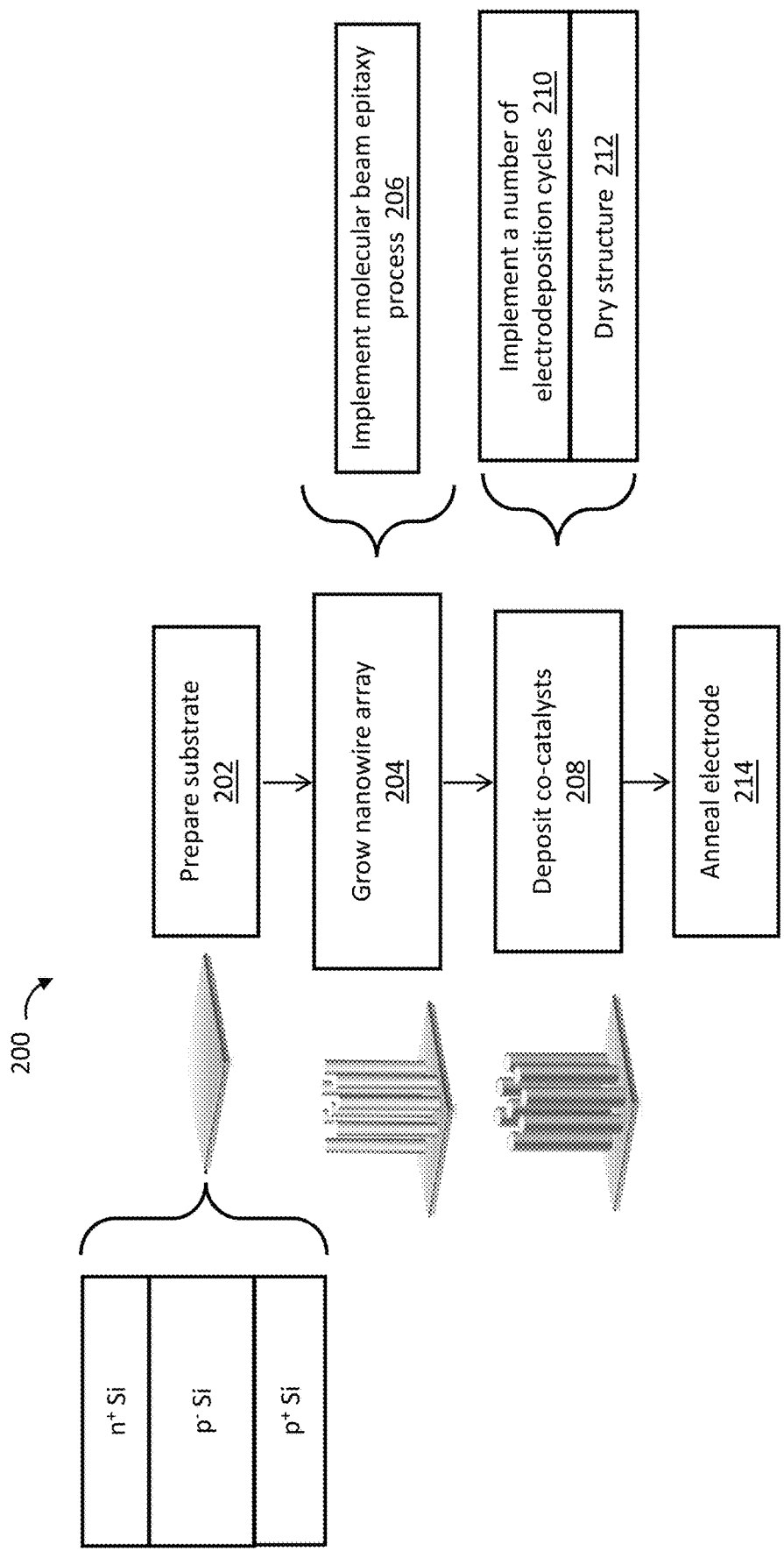
FIG. 2 is a method of fabricating an electrode with a co-catalyst arrangement disposed along a plurality of nanowires for reduction of carbon dioxide ($CO_2$) into methane in accordance with one example.

FIG. 2 depicts a method 200 of fabricating an electrode of an electrochemical system in accordance with one example. The method 200 may be used to manufacture any of the working electrodes described herein or another electrode. The method 200 may include additional, fewer, or alternative acts. For instance, the method 200 may or may not include one or more acts directed to preparing a substrate (act 202).

The method 200 may begin with an act 202 in which a substrate is prepared. The substrate may be or be formed from a p-n Si wafer. In one example, a 2-inch Si wafer may be used, but other (e.g., larger) size wafers may be used. Other semiconductors and substrates may be used. Preparation of the substrate may include one or more thermal diffusion or other doping procedures. In some cases, the act 202 may include two or more doping procedures to establish an $n^+$ layer or region, a $p^-$ layer or region, and a $p^+$ layer or region, as shown in the example of FIG. 2.

In the example of FIG. 2, the method 200 includes an act 204 in which GaN or other nanowire arrays (or other conductive projections) are grown or otherwise formed on the substrate. The nanowire growth may be achieved in an act 206 in which plasma-assisted molecular beam epitaxy is implemented. The act 206 may be implemented under nitrogen-rich conditions. In one example, the growth conditions were as follows: a growth temperature of 790° C. for 1.5 h, a Ga beam equivalent pressure of about $6 \times 10^{-8}$ Torr, a nitrogen flow rate of 1 standard cubic centimeter per minute (sccm), and a plasma power of 350 W. The nanowires provide platforms or other structures for the co-catalyst arrangement deposited in the following steps. Other platforms or structures may be formed.

In an act 208, a catalyst arrangement is deposited along each nanowire or other conductive projection of the electrode. The catalyst arrangement includes a copper-based catalyst and an iron-based catalyst for the reduction of carbon dioxide ($CO_2$) in the chemical cell, as described herein. The act 208 may include implementation of a number of electrodeposition cycles in an act 210, after which the structure is dried in an act 212. For example, the number of cycles may be about 10, but the number may vary. The act 210 may include immersing the array of conductive projections in a solution, the solution including a copper precursor and an iron precursor. Alternative or additional deposition procedures may be used. Further details regarding examples of the electrodeposition are provided below.

In some cases, the method 200 includes an act 214 in which the electrode is annealed. One example electrode was annealed at 400° C. for 10 min in forming gas (5% $H_2$, balance $N_2$) at a flow rate of 200 sccm. The parameters of the anneal process may vary.

Figure 4:
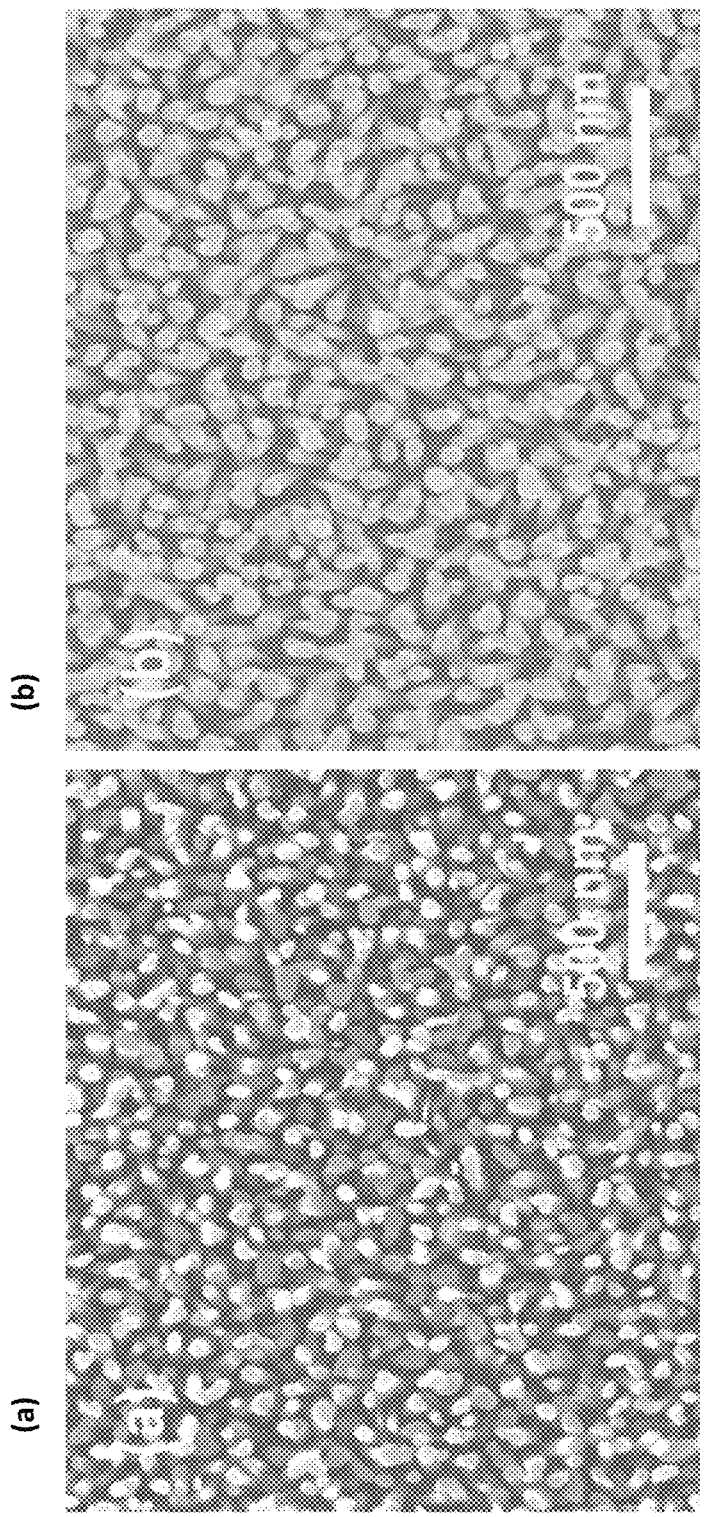
FIG. 4 depicts scanning electron microscope (SEM) images of an electrode with a plurality of GaN nanowires before and after deposition of a CuFe-based co-catalyst arrangement in accordance with one example in which implementation of 10 hours of electrodeposition at −1.2 V in $CO_2$-purged 0.5 M $KHCO_3$ aqueous solution under standard one-sun irradiation.

FIG. 4 depicts the results of the method 200 in accordance with one example. SEM images of GaN nanowires are shown before and after electrodeposition of the copper-based and iron-based co-catalysts.

Details regarding photoelectrochemical (PEC) performance of the co-catalyst arrangement, e.g., the binary Cu—

Fe electrocatalyst, of the disclosed PEC electrodes for the selective reduction of $CO_2$ to $CH_4$ are now provided in connection with FIGS. 5-9.

Density functional theory (DFT) calculations reveal that the co-catalysts Cu and Fe in the binary system work in synergy to induce a significantly distorted O—C—O angle of 126.05° from its original linear configuration at the interface to render a strong interaction with $CO_2$, and a drastic reduction in the reaction energy barrier, thus greatly facilitating methane synthesis. Experimentally, the Cu—Fe binary electrocatalyst is shown to exhibit high current density of −38.3 mA cm$^{-2}$ for silicon-based photoelectrodes with high Faradaic efficiency of up to 51% and high TOF of 2176 h$^{-1}$ for PEC $CO_2$ reduction toward $CH_4$ under simulated solar light (AM 1.5 G, 100 mW cm$^{-2}$) at −1.2 V versus reversible hydrogen electrode (RHE), which is superior to that of both Cu and Fe catalyst individually. In addition, in some cases, the photocathode may be made entirely of earth-abundant materials by industrial semiconductor manufacturing processes, thereby presenting a promising route for producing clean fuels in aqueous solution using solar energy.

Further details regarding the mechanism(s) of $CO_2$ adsorption and/or activation over Cu(111) and $Fe_xO_y$/Cu(111) are now described. Because the initial activation of the inert $CO_2$ is used for the subsequent reactions, $CO_2$ adsorption characteristics were first investigated using DFT calculations. As iron appears to be in its oxidation state, $Fe_xO_y$ was used in the analysis. The preferred orientation of Cu surface with the lowest surface energy, i.e., Cu(111) was adopted. Therefore, an inverse hydrogenated $Fe_3O_6H_6$/Cu(111) was utilized as a representative model for Cu—Fe electrocatalyst, by taking the aqueous $CO_2$ reduction environment and the preferable H spillover from metal particles to oxide support into consideration. Illustrated in FIGS. 1 and 5 are the optimized structures for $CO_2$ adsorption on $Fe_3O_6H_6$/Cu(111). For the case of $CO_2$ on Cu(111), $CO_2$ remains in the original linear configuration with the O—C—O angle of 179.67°, and the two C—O bond lengths are similar to the $CO_2$ isolated gas-phase. On the other hand, it is found that for the case of $CO_2$ at the $Fe_3O_6H_6$/Cu(111) interface, the C atom strongly binds to the Cu atom underneath, with a bond length of 1.98 Å; and one O atom attaches to the Fe atom with a shorter bond length of 1.96 Å. This signifies a much stronger bonding, which results in a significant distortion of $CO_2$ away from its original linear form to a bent form with an O—C—O angle of 126.05°. A bidentate configuration is therefore formed, which facilitates the subsequent reactions. In addition, the interaction of $CO_2$ with the $Fe_3O_6H_6$/Cu(111) interface weakens the two C—O bonds of $CO_2$, leading to elongated C—O bonds (1.28 and 1.25 Å, respectively) from the original bond length of 1.18 Å in an isolated $CO_2$. The weakened C—O bonds and the distorted $CO_2$ configuration together highlight an activation of $CO_2$ upon chemisorption at the interface, which is in stark contrast with the negligible activation of $CO_2$ on Cu(111) that is highly beneficial for $CO_2$ reduction. The $CO_2$ activation mechanism at the $Fe_xO_y$/Cu(111) interface presents a situation in which an under-coordinated Fe atom at the edge of the oxide cluster (i.e., essentially an O vacancy) acts as the active center to bind one of the O atoms in $CO_2$. The coexistence of iron oxides and Cu nanoparticles facilitates the formation of the bifunctional $Fe_xO_y$/Cu(111) interface. On one hand, the $Fe_xO_y$/Cu(111) interface allows multiple adsorption sites and directly participates in stabilizing the key reaction intermediates, such as *$CO_2$, *$C_xH_yO_z$, and *$C_xH_y$. On the other hand, the strong interaction between iron oxides and Cu nanoparticles results in a unique electronic structure that differs from those of isolated components, which is suitable for $CO_2$ activation and its subsequent transformation. These results are consistent with the observation in thermal $CO_2$ catalysis at the metal/oxide interface, and are further verified by a $CO_2$ adsorption capacity measurement showing a much larger $CO_2$ adsorption capacity for the Cu Fe-based catalyst arrangements of the disclosed electrodes, e.g., on GaN nanowires with a Si substrate, relative to that of Cu alone on GaN nanowires and a Si substrate.

The synthesis and characterization of the binary CuFe electrocatalyst are now described in accordance with a number of examples. Inspired by the theoretical results above, a binary CuFe catalyst is monolithically integrated with GaN nanowire arrays on a planar n$^+$-p silicon wafer, which may be achieved by combining highly controlled molecular beam epitaxy with facile electrodeposition. As illustrated in FIGS. 1-6, one-dimensional (1-D) GaN nanowires are first grown on planar n$^+$-p silicon junction, e.g., with a length of about 300 nm and diameters varying from about 30 to about 40 nm, using molecular beam epitaxy. Transmission electron microscope (TEM) images show that the GaN nanowires are nearly defect-free with lattice spacing of about 0.26 nm, suggesting the c-axis growth direction. Using these nanowires as supports, Cu-based and Fe-based catalysts were facilely co-deposited via electrocatalysis. After the electrodeposition, the morphology of the GaN nanowire arrays remains largely unchanged, as shown by comparing the images depicted in Parts (a) and (b) of FIG. 4. Furthermore, scanning transmission electron microscope-high angle annular dark-field (STEM-HAADF) images and elemental distribution mappings illustrate that both the Cu-based and Fe-based catalysts are clearly dispersed on the GaN nanowires with a unique alloyed geometry, as shown in the example images of FIG. 6.

The loading of the binary CuFe catalyst arrangement may be optimized by the one-dimensional GaN nanowires. For instance, 1-D nanostructures are favorable for exposing the co-catalyst arrangement with high-density active sites. The ultrahigh surface-to-volume ratio of one-dimensional nanostructures helps to reduce the loading amount of the catalyst. The inductively coupled plasma-atomic emission spectrum (ICP-AES) indicates that the content of the binary CuFe catalyst arrangement is 0.041 μmol·cm$^{-2}$ with an Fe/Cu ratio of 6.3/1. X-ray photoelectron spectroscopy (XPS) measurement was conducted to further analyze the chemical states of Cu and Fe. The characteristic peaks of Cu 2p 3/2 and Cu 2p 1/2 appear at 933.2 eV and 953.1 eV, as shown in Part (h) of FIG. 6, due to metallic copper and/or partially oxidized copper. Meanwhile, the peaks of about 711 eV and 725 eV are associated with Fe 2p 3/2 and Fe 2p 1/2, respectively, as shown in Part (i) of FIG. 6. These peaks originate from iron oxides and/or hydroxides ($Fe_xO_y$/$Fe_x(OH)_y$). An X-ray diffraction spectrum measurement illustrates that only a featured peak of GaN (002) at about 34° was observed for both GaN/Si and CuFe catalysts on GaN nanowires on a Si substrate. This may originate from both the low content of Cu and Fe and their amorphous phase, which agree well with TEM and ICP-AES characterizations. The amorphous copper-iron catalyst supported on one-dimensional GaN nanowire arrays may provide sufficient surface defects as well as a large number of low-coordinated atoms of the catalyst. Consequently, abundant active sites can be produced for $CO_2$ reduction.

The photoelectrochemical $CO_2$ reduction reaction using the CuFe co-catalyst arrangement of the disclosed electrodes is now described in connection with a number of examples.

The PEC $CO_2$ reduction performance of the CuFe catalyst arrangement on GaN nanowires on a Si substrate (hereinafter "CuFe@GaN NWs/Si"), as well as other photocathodes, was examined in $CO_2$-saturated 0.5 mol/L of $KHCO_3$ aqueous solution. As shown in Part (a) of FIG. 7, among all five of the tested photocathodes, CuFe@GaN NWs/Si exhibits the best J-V curve under standard one-sun illumination. Compared to bare $n^+$-p silicon junction, GaN nanowires on a Si substrate shows an evidently improved J-V curve with an onset potential of −0.33 V (corresponding to a current density of −0.1 mA $cm^{-2}$), but still suffers from rapid surface recombination and slow reaction kinetics because of the lack of catalysts. The introduction of catalysts may significantly improve the J-V behavior. The binary CuFe catalyst shows an enhancement compared to both Fe and Cu individually, confirming the synergetic effect of Cu and Fe for the reaction. The superior onset potential of +0.23 V of the CuFe@GaN NWs/Si structure is 200 mV and 290 mV higher than that of nanowires with either Fe or Cu alone, i.e., "Fe/GaN NWs/Si" and "Cu/GaN NWs/Si," respectively. The current density of the CuFe@GaN NWs/Si structure reaches −38.3 mA $cm^{-2}$ at −1.2 V, which is close to the light-limited current of the silicon-based photocathode (about −45 mA cm') under one-sun illumination. Such improved performance may arise primarily from the CuFe catalyst offering active centers to promote the reaction kinetics. Moreover, photoluminescence spectra illustrates that the featured peak intensity for the various nanowire arrangements decreased in the following order of GaN NWs/Si>Cu/GaN NWs/Si>CuFe@GaN NWs/Si. It indicates that a Schottky junction is formed between the loaded cocatalysts and the GaN semiconductor, which is capable of greatly promoting the electron-hole separation. Furthermore, the dramatic reduction in photoluminescence intensity of the CuFe@GaN nanowires as compared to Cu/GaN nanowires suggests that the binary CuFe catalyst is more favorable than Cu catalyst to promote electron-hole separation in GaN nanowires. Additionally, the light intensity affected the J-V curve significantly. The current density increased with the increasing intensity because more electron-hole pairs could be formed under illumination with higher intensity. In contrast, there is nearly no current observed in the dark during the entire potential range examined. These results suggest that light-driven generation of electron-hole pairs is a useful step for $CO_2$ reduction. Moreover, control experiments confirm that the LSV behavior under $CO_2$ atmosphere is superior to that under argon atmosphere, which further suggests the strong adsorption and activation of $CO_2$ over the binary CuFe catalyst. Based on Faradaic efficiency measurements, both the GaN nanowire on Si substrate and Fe/GaN nanowire on Si substrate arrangements do not produce any methane, as shown in Part (b) of FIG. 7. Hydrogen was the main byproduct with a trace amount of CO (Faradaic efficiency <1%). Although Cu is catalytically active for methane synthesis, the Cu/GaN nanowire/Si substrate arrangement only shows a low Faradaic efficiency of about 20%. In stark contrast, the binary CuFe catalyst arrangement of the disclosed electrodes gives rise to more than a two-fold improvement in Faradaic efficiency to 51% with a high current density of −38.3 mA $cm^{-2}$. As a consequence, the partial current density of the CuFe@GaN NWs/Si structure for $CH_a$ formation is as high as −19.5 mA $cm^{-2}$, as shown in Part (c) of FIG. 7, which is remarkably higher than the previously reported silicon photocathode for PEC $CO_2$ reduction toward $CH_4$. The optimal productivity of the CuFe@GaN NWs/Si structure for $CH_a$ approaches 88.8 $\mu$mol·$h^{-1}$·$cm^{-2}$, which is 3.7 times larger than that of the Cu/GaN nanowire/Si substrate arrangement, while the Fe/GaN nanowire/Si substrate arrangement did not show any productivity under the same experimental conditions, as shown in Part (d) of FIG. 7. These results undoubtedly suggest that the binary CuFe catalyst arrangement of the disclosed electrodes plays a useful role in promoting the methane production. Electronic properties evaluation of Cu using X-ray photoelectron spectrum also demonstrates a considerable shift of about +0.3 eV. Cu 2p 3/2 was shifted from 932.9 to 933.2 eV by incorporating Fe species, suggesting that Cu in CuFe@GaN NWs/Si structure is electron-deficient compared to that of a Cu/GaN nanowire/Si substrate arrangement. Such a notable change in electronic properties may contribute to tuning the catalytic properties of Cu, and thus facilitates the $CO_2$ reduction reaction towards methane. It is noted that there is an optimized CuFe catalyst for maximum activity and methane selectivity. At a low loading amount of about 0.033 $\mu$mol·$cm^{-2}$ with a Fe/Cu ratio of 4.5/1, the active sites of the CuFe@GaN NWs/Si structure are insufficient for suppressing charge carrier surface recombination and improving the kinetics, resulting in limited activity. However, at a higher Fe/Cu ratio of 12.9/1 with CuFe overloading of 0.075 $\mu$mol $cm^{-2}$, the light absorption of the silicon semiconductor may be suppressed, and the inherent catalytic activities would be lowered. Therefore, there may be a useful loading amount of 0.041 $\mu$mol $cm^{-2}$ with a Fe/Cu ratio of about 6.3/1, enabling optimal optical and catalytic activity for highly efficient PEC $CO_2$ reduction toward $CH_4$.

The Faradaic efficiency may depend on the applied potentials. Test results are illustrated in Part (e) of FIG. 7 for a number of examples. The applied potentials play a role in the Faradaic efficiency. The onset of the CuFe@GaN NWs/Si structure for methane synthesis is −0.4 V with a methane Faradaic efficiency of 1.2%, which is more positive than that of −0.7 V for Cu alone. It reveals that a significantly lower driving force (by as much as 0.3 V) is involved for the binary CuFe catalyst for the $CO_2$ reduction reaction. The underlying cause is that the binary CuFe catalyst is capable of initially activating the stable $CO_2$ molecule and reducing the high energy barrier, which is in agreement with the theoretical calculation. At potentials more positive than −0.4 V, the driving force is sufficient for hydrogen production but not for overcoming the high energy barrier for methane synthesis. Methane was thus not formed. As the potential shifts negatively, Faradaic efficiency of $CH_4$ formation is continuously improved with the increasing driving force and approaches to a maximum of 51% at −1.2 V. A more negative potential, however, leads to a mild reduction in Faradaic efficiency to 42% because of the severe competition of hydrogen evolution under high overpotential as well as the $CO_2$ mass transport limitation.

High turnover frequency (TOF) is one aspect of the disclosed electrodes and systems. As shown in FIG. 7, plot f, an appreciable TOF of 9.5 $h^{-1}$ is achieved under standard one-sun illumination at the onset potential of −0.4 V. The negative shift of potential results in increasing TOF. At −1.2 V, a maximum TOF, which is as high as 2176 $h^{-1}$, is achieved at a high current density of −38.3 mA cm' and high Faradaic efficiency of up to 51% despite of a slight reduction at more negative potential. Herein, the superior TOF may originate from the unique synergy of Cu and Fe in the binary catalytic system. Additionally, the pronounced sunlight-absorption ability and efficient charge carrier extraction of the GaN/Si platform also play a role, as addressed hereinbelow.

Further details regarding $CO_2$ conversion at the interface of $Fe_xO_y/Cu$ are now provided in accordance with a number of examples. To gain fundamental insights underlying the superior performance of the binary CuFe-based catalyst arrangement, the reaction pathways, reaction intermediates, potential-determining steps (PDSs), and free energy diagrams of the catalytic $CO_2$ reduction to $CH_4$ on $Fe_3O_6H_6/Cu(111)$ are described in comparison to those on Cu(111). Part (a) of FIG. 8 shows the optimized structures of adsorption configuration for each intermediate on Cu(111) and $Fe_3O_6H_6/Cu(111)$, respectively. On the $Fe_3O_6H_6/Cu(111)$, the interfacial sites directly participate in binding and stabilizing all the reaction intermediates. The O-bound species (*O and *OH) prefer to bind to reduced $Fe^{2+}$ cation in the metal oxide with the $\eta^1$-$O_{Fe2+}$ configuration, while for C, O-bound species (species bound through both C and O, i.e., *COOH, *CO, *CHO, *$CH_2O$, and *$CH_3O$), the metal/oxide interfacial sites are favored with the $\eta^2$-$C_{Cu}O_{Fe2+}$ configuration. Consequently, the $Fe_3O_6H_6/Cu(111)$ interfacial sites are useful for methane synthesis via stabilizing all the intermediates during the complex eight-electron/proton coupling transfer process.

Part (a) of FIG. 8 depicts the free energy diagram of the lowest energy pathways of $CO_2$ reduction on the Cu(111) and $Fe_3O_6H_6/Cu(111)$ under zero electrode potential (U=0 V) respectively. For the case of Cu(111), the protonation of CO species (i.e., *CO→*CHO) is the the potential determining step(s) (PDS), exhibiting a free energy change of 0.85 eV. On the other hand, for $CO_2$ at the interface of $Fe_3O_6H_6/Cu(111)$, the PDS remains the same, but with an appreciably reduced free energy change of 0.51 eV. By increasing the stability of the *CHO species relative to *CO, the energy efficiency of PEC reduction of $CO_2$ on the $Fe_3O_6H_6/Cu(111)$ interface may surpass the pure metals, due to the various structure with complementary chemical properties in the metal/oxide interfacial sites that work in synergy to facilitate the $CO_2$ reduction into $CH_4$. Meanwhile, $Fe_3O_6H_6/Cu(111)$ may hinder further reaction steps toward oxygen reduction due to an increased free energy change associated with the proton/electron-transfer step of *OH (i.e., *OH protonation to $H_2O(g)$), as shown in Part (a) of FIG. 8. For this step, the Cu(111) surface involves 0.14 eV, while the $Fe_3O_6H_6/Cu(111)$ involves 0.33 eV. Nonetheless, it would not alter the PDSs of the $CO_2$ reduction on the Cu(111) surface and $Fe_3O_6H_6/Cu(111)$ interface with both of them lying in the *CO/*CHO step.

Part (b) of FIG. 8 shows the corresponding free energy diagrams of $CO_2$ reduction at applied electrode potentials of U=−0.85 and −0.51 V for the Cu(111) and $Fe_3O_6H_6/Cu(111)$, respectively. These two electrode potentials are the voltages involved for eliminating the free energy change of the PDSs (*CO/*CHO). It illustrates that the $CH_4$-forming reaction from $CO_2$ might occur at −0.85 and −0.51 V (vs. RHE) on the Cu(111) surface and $Fe_3O_6H_6/Cu(111)$ interface, respectively. It suggests that for methane synthesis, the onset potential of $Fe_3O_6H_6/Cu(111)$ is 0.34 V more positive than that of Cu(111), which is in agreement with the experimental results that the onset of the binary CuFe catalyst is 0.3 V lower than that of Cu alone.

In addition to $Fe_3O_6H_6/Cu(111)$, $CO_2$ reduction at other possible hydrogenated $Fe_xO_y/Cu$ interfaces, i.e., $Fe_3O_3H_3/Cu(111)$ and $Fe_6O_7H_7/Cu(111)$, was investigated. The results show that the reaction energetics on $Fe_3O_3H_3/Cu(111)$ and $Fe_6O_7H_7/Cu(111)$ are similar to that of $Fe_3O_6H_6/Cu(111)$.

Additionally, to consider the effect of partial oxidization on Cu as characterized in the XPS data, a series of DFT calculations were conducted by constructing iron oxide clusters with varying atomic ratios of Fe, Cu, and O on the surface of partially oxidized Cu, i.e., $Fe_xO_y/Cu_2O(111)$, similar to the cases of Cu(111). A similar conclusion has been found on the $Fe_xO_y/Cu_2O(111)$ interfaces, that is, in spite of quantitative variations among different systems, the similar qualitative trend confirms the role of the $Fe_xO_y/Cu$ or $Fe_xO_y/Cu_2O(111)$ interface in activating $CO_2$ and stabilizing the reaction intermediates to facilitate the $CO_2$ reduction for methane synthesis. The $CO_2$ reduction on pristine $Cu_2O$ (111) is bottlenecked by both of the hydrogenation of *CO to *CHO and *OH to $H_2O$ with a free energy change for PDS being 1.02 and 1.12 eV, respectively. In contrast, free energy change of the hydrogenation of *CO to *CHO has been lowered to 0.89, 0.76, and 0.63 eV on $Fe_3O_3H_3/Cu_2O(111)$, $Fe_3O_6H_6/Cu_2O(111)$, and $Fe_6O_7H_7/Cu_2O(111)$, respectively. And the free energy change for another PDS of hydrogenation of *OH to $H_2O$ has also been decreased due to a selective destabilization for the reaction intermediate of *OH. The reaction mechanism of $Fe_xO_yH_z/Cu_2O(111)$ is presumably the same as that of $Fe_xO_yH_z/Cu(111)$, because all the reaction intermediates share similar adsorption configurations and react with the Cu atoms on $Cu_2O(111)$ surface.

Further details regarding the contribution and function of the GaN nanowires are now described in connection with a number of examples. Apart from the catalyst, the influence of the GaN nanowires on the excellent performance is now described. In the absence of the GaN nanowires, CuFe on a Si substrate ("CuFe/Si arrangement") exhibited a planar morphology similar to that of a bare silicon substrate. Control experiments indicate that the J-V curve of the CuFe/Si arrangement without GaN nanowires is inferior to the CuFe@GaN NWs/Si structure under the same conditions, as shown in Parts (a) and (b) of FIG. 9. The current density of CuFe/Si is only −1.3 mA $cm^{-2}$ at about −1.2 V, which is lower by a factor of 29.5 than −38.3 mA $cm^{-2}$ for the CuFe@GaN NWs/Si structure, as shown in Part (a) of FIG. 9. Meanwhile, the Faradaic efficiency of 16.6% for the CuFe/Si arrangement is also much lower than that of 51% measured for the CuFe@GaN NWs/Si structure. In consequence, the productivity of the CuFe/Si arrangement (0.9 μmol·$cm^{-2}$·$h^{-1}$) is two orders of magnitude less than of the CuFe@GaN NWs/Si structure (88.9 μmol·$cm^{-2}$·$h^{-1}$), as shown in Part (b) of FIG. 9. Both optical and electronic properties further show the significant improvement caused by the GaN nanowires. UV-Vis relative differential reflectance spectra analysis showed that the GaN nanowires enhance the sunlight absorption of the $n^+$-p silicon junction in a long wavelength range due to the light trapping effect. In addition, the bandgaps of GaN and Si are approximately aligned, and the GaN nanowires are nearly defect-free and has high electron mobility. Under illumination, the photogenerated electrons are thus readily extracted from the $n^+$-p silicon junction and further transferred to the deposited CuFe catalyst in the presence of the GaN nanowires, which is in agreement with electrochemical impedance spectroscopy measurements. Therefore, it is reasonably concluded that the GaN nanowires may be a useful candidate for accelerating the reaction by enhancing the optical and electronic properties. Furthermore, owing to the one-dimensional structure of the GaN nanowire arrays, the catalysis may be spatially decoupled from sunlight collection and charge carriers' separation, as shown in Part (c) of FIG. 9, which may maximize the synergy of Cu and Fe for methane synthesis by providing sufficient active sites with high atom efficiency.

Isotopic experiments were also conducted to clarify that the methane was produced from $CO_2$ reduction. When the reaction was performed in C13 labeled bicarbonate aqueous solution under the atmosphere of $^{13}CO_2$, gas chromatography-mass spectroscopy (GC-MS) analysis only showed a peak at m/z=17 resulting from $^{13}CH_4$. The formation of $^{12}CH_4$ was negligible. In contrast, when the blank experiment was carried out in argon-purged $Na_2SO_4$ aqueous solution, there was no methane synthesized. These results suggest that methane is produced from $CO_2$. Moreover, the disclosed device is capable of exhibiting stable operation of 10 hours. No elemental dissolution of the CuFe@GaN NWs/Si into the aqueous solution was found by ICP; and the morphology of the catalytic architecture remained unchanged, further confirming the stability of the device.

Further details regarding the fabrication of a binary CuFe catalyst arrangement over GaN Nanowires (NWs) and a Si substrate (Si) by electrocatalysis are now described in connection with a number of examples. A GaN NWs/Si structure was produced as the platform for depositing the binary CuFe catalyst arrangement. A polished p-Si (100) wafer was doped using phosphorus and boron as n-type and p-type dopants by spin coating, respectively. The doped silicon was then annealed at 900° C. under argon atmosphere for 4 hours to produce an $n^+$-p silicon junction. The as-prepared $n^+$-p silicon junction was further employed for plasma-assisted molecular beam epitaxial growth of GaN nanowires with germanium as an n-type dopant. The growth was carried out at 790° C. under nitrogen-rich conditions with a nitrogen flow rate of 1.0 standard cubic centimeter per minute (sccm) for 1.5 hours. The Ga beam pressure is about $6 \times 10^{-8}$ torr with a plasma power of 350 W.

In the electrodeposition procedure, the GaN NWs/Si structure was immersed into a three-electrode cell, in which Pt wire and Ag/AgCl were used as counter electrode and reference electrode, respectively. A 200 mL mixture of $CuCl_2$ (Sigma-Aldrich, ≥99%) and $FeCl_2$ (Alfa-Aesar, 99.5%) aqueous solution with desired concentrations was added into the chamber. The fabrication of an example of the CuFe-based catalyst arrangement on the GaN NWs/Si structure with a $Cu_1Fe_{6.3}$ ratio may use 0.1 mmol/L $CuCl_2$ and 0.01 mmol/L $FeCl_2$ as the precursors of the CuFe catalyst. The electrodeposition was conducted using cyclic voltammetry at the potential range from +2.5 to −2.5 V versus Ag/AgCl. The number of depositing cycles was 10 with a scanning rate of 100 mV/s. The Fe/Cu ratio in the CuFe catalyst may be tailored by tuning the concentration ratio of $FeCl_2$ to $CuCl_2$ in the precursors' solutions while keeping the $CuCl_2$ concentration of 0.1 mmol/L unchanged. The fabricated photoelectrodes were thoroughly rinsed with distilled water and dried with air after the electrodeposition. Both of the Cu/GaN NWs/Si and Fe/GaN NWs/Si arrangements may be produced using the same procedure, with the main difference being the precursors used. Moreover, the CuFe catalyst was electrochemically deposited on bare $n^+$-p silicon junction for a comparison through the same procedure.

In summary, described above are electrodes and systems in which an inexpensive binary catalyst arrangement (e.g., CuFe catalyst) is coupled with GaN nanowires (or other conductive projections) on a n+-p silicon wafer. The binary catalyst arrangement is highly active and selective for photoelectrochemical $CO_2$ reduction toward $CH_4$. Both experimental and theoretical results indicate that Cu and Fe work in synergy for spontaneous $CO_2$ activation and conversion with severely deformed $CO_2$ molecular structure and reduced reaction energy barrier by stabilizing key reaction intermediates. As a result, a high current density of −38.3 mA $cm^{-2}$ for a silicon-based photocathode with a high Faradaic efficiency of 51% and a distinct turnover frequency of 2176 $h^{-1}$ is achieved for methane synthesis under simulated solar light. The device is manufactured using earth-abundant materials and may be operated for at least 10 hours without degradation. The disclosed electrodes and systems present a promising route for producing clean solar fuels from photoelectrocatalytic $CO^2$ reduction in an aqueous cell.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. An electrode of a chemical cell, the electrode comprising:
   a substrate having a surface;
   an array of projections supported by the substrate and extending outward from the surface of the substrate; and
   a catalyst arrangement disposed along each projection of the array of projections, the catalyst arrangement comprising a copper-based catalyst and an iron-based catalyst for the chemical cell;
   wherein the copper-based catalyst comprises a plurality of copper nanoparticles.

2. The electrode of claim 1, wherein each copper nanoparticle of the plurality of copper nanoparticles is composed of metallic copper.

3. The electrode of claim 1, wherein the iron-based catalyst comprises a distribution of iron oxide disposed in a co-catalyst arrangement with the copper-based catalyst.

4. The electrode of claim 1, wherein the copper-based catalyst is disposed between the iron-based catalyst and the projection.

5. The electrode of claim 1, wherein the copper-based catalyst and the iron-based catalyst are linked by a metallic bond.

6. An electrode of a chemical cell, the electrode comprising:
   a substrate having a surface;
   an array of projections supported by the substrate and extending outward from the surface of the substrate; and
   a catalyst arrangement disposed along each projection of the array of projections, the catalyst arrangement comprising a copper-based catalyst and an iron-based catalyst for the chemical cell;
   wherein:
     the substrate comprises a semiconductor material; and
     the semiconductor material is configured to generate charge carriers upon absorption of solar radiation such that the chemical cell is configured as a photoelectrochemical system.

7. The electrode of claim 6, wherein the array of projections are configured to extract the charge carriers generated in the substrate.

8. The electrode of claim 1, wherein each projection of the array of projections comprises a respective nanowire.

9. The electrode of claim 1, wherein each projection of the array of projections comprises a Group III-V semiconductor material.

10. The electrode of claim 1, wherein the substrate is planar.

11. The electrode of claim 1, wherein each projection of the array of projections has a semiconductor composition, the semiconductor composition of the array of projections establishing a Schottky junction with the catalyst arrangement.

12. The electrode of claim 1, wherein the catalyst arrangement has an iron-to-copper ratio of about 6.3 to 1.

13. The electrode of claim 1, wherein the copper-based catalyst is partially oxidized.

14. The electrode of claim 1, wherein the chemical cell is a thermochemical cell.

15. An electrochemical system comprising a working electrode configured in accordance with the electrode of claim 1, and further comprising:
 a counter electrode;
 an electrolyte in which the working and counter electrodes are immersed; and
 a voltage source that applies a bias voltage between the working and counter electrodes;
 wherein the bias voltage establishes a preference for the reduction of carbon dioxide (CO2) at the working electrode toward methane.

16. A photoelectrode for a photoelectrochemical cell, the photoelectrode comprising:
 a substrate comprising a light absorbing material, the light absorbing material being configured to generate charge carriers upon illumination;
 an array of conductive projections supported by the substrate, each conductive projection of the array of conductive projections being configured to extract the charge carriers from the substrate;
 copper-based catalysts disposed across each conductive projection of the array of conductive projections; and
 a distribution of an iron-based catalyst disposed adjacent to the copper-based catalysts in a co-catalyst arrangement;
 wherein the copper-based catalysts are configured as copper nanoparticles.

17. The photoelectrode of claim 16, wherein the iron-based catalyst comprises iron oxide.

18. The photoelectrode of claim 16, wherein each conductive projection of the array of conductive projections comprises a respective nanowire.

19. The photoelectrode of claim 16, wherein the copper-based catalysts are composed of metallic copper.

20. The photoelectrode of claim 16, wherein each conductive projection of the array of conductive projections comprises a Group III-V semiconductor material.

21. A photoelectrochemical system comprising a working photocathode configured in accordance with the photoelectrode of claim 16, and further comprising:
 a counter electrode;
 an electrolyte in which the working photocathode and the counter electrode are immersed; and
 a voltage source that applies a bias voltage between the working photocathode and the counter electrode;
 wherein the bias voltage establishes a preference for the reduction of carbon dioxide (CO2) at the working electrode toward methane.

22. A method of fabricating an electrode of an electrochemical system, the method comprising:
 growing an array of projections on a substrate; and
 depositing a catalyst arrangement along each projection of the array of projections, the catalyst arrangement comprising a copper-based catalyst and an iron-based catalyst;
 wherein the copper-based catalyst comprises a plurality of copper nanoparticles.

23. The method of claim 22, wherein depositing the catalyst arrangement comprises implementing a number of electrodeposition cycles.

24. The method of claim 23, wherein the number of electrodeposition cycles is about 10 cycles.

25. The method of claim 23, wherein implementing the number of electrodeposition cycles comprises immersing the array of projections in a solution, the solution comprising a copper precursor and an iron precursor.

\* \* \* \* \*